(12) United States Patent
Skjæveland

(10) Patent No.: US 10,111,371 B2
(45) Date of Patent: Oct. 30, 2018

(54) WEARING PART ARRANGEMENT FOR PLOUGH SHARE

(71) Applicant: KVERNELAND GROUP OPERATIONS NORWAY AS, Kverneland (NO)

(72) Inventor: Magne Skjæveland, Klepp St. (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 8 days.

(21) Appl. No.: 14/400,490

(22) PCT Filed: May 22, 2013

(86) PCT No.: PCT/NO2013/050091
§ 371 (c)(1),
(2) Date: Nov. 11, 2014

(87) PCT Pub. No.: WO2013/176553
PCT Pub. Date: Nov. 28, 2013

(65) Prior Publication Data
US 2015/0129266 A1    May 14, 2015

(30) Foreign Application Priority Data

May 24, 2012    (NO) .................................. 20120613

(51) Int. Cl.
*A01B 15/06*    (2006.01)

(52) U.S. Cl.
CPC .................... *A01B 15/06* (2013.01)

(58) Field of Classification Search
CPC ........................................................ A01B 15/06
USPC ................................................................ 172/719
See application file for complete search history.

(56) References Cited

U.S. PATENT DOCUMENTS

| | | | | |
|---|---|---|---|---|
| 879,487 | A * | 2/1908 | McWane | A01B 15/06 172/719 |
| 1,333,969 | A * | 3/1920 | French | A01B 15/06 172/719 |
| 1,497,144 | A * | 6/1924 | Jackson | A01B 15/06 172/724 |
| 2,316,097 | A * | 4/1943 | Mohr | A01B 15/06 172/761 |
| 2,588,585 | A * | 3/1952 | Stockmar | A01B 51/00 172/177 |
| 2,619,054 | A * | 11/1952 | Bell | A01C 23/025 111/123 |
| 2,906,015 | A * | 9/1959 | Piepho | A01B 15/06 172/745 |

(Continued)

FOREIGN PATENT DOCUMENTS

| | | | |
|---|---|---|---|
| EP | 1 259 105 B1 | 4/2006 | |
| EP | 1 900 269 B1 | 1/2011 | |

(Continued)

*Primary Examiner* — Thomas B Will
*Assistant Examiner* — Joel F. Mitchell
(74) *Attorney, Agent, or Firm* — Foley & Lardner LLP

(57) ABSTRACT

A wearing-part arrangement for a leading edge provided on a ploughshare of a plough body includes a plough point that is releasably attached to the plough body and provided with a pointed front portion. At least the front portion is mirror-symmetrical around a longitudinal axis of the plough point.

15 Claims, 3 Drawing Sheets

(56) References Cited

U.S. PATENT DOCUMENTS

| | | | | |
|---|---|---|---|---|
| 3,519,084 | A | * | 7/1970 | Fenet ................... A01B 15/06 172/719 |
| RE28,271 | E | * | 12/1974 | Lehman et al. ....... A01B 39/14 172/153 |
| 3,959,901 | A | * | 6/1976 | Klett ..................... E02F 9/2841 172/699 |
| 4,210,211 | A | * | 7/1980 | Chandler ............... A01B 13/08 172/451 |
| 4,269,274 | A | * | 5/1981 | Robertson ............. E02F 9/2808 172/699 |
| 4,576,239 | A | * | 3/1986 | Launder ............... A01B 35/225 172/751 |
| 4,754,816 | A | | 7/1988 | Edmission |
| 4,779,686 | A | * | 10/1988 | Ryan ................... A01B 35/225 172/730 |
| 5,027,535 | A | * | 7/1991 | Maguina-Larco .... E02F 9/2825 37/455 |
| D328,466 | S | * | 8/1992 | Robinson ....................... D15/29 |
| D336,304 | S | * | 6/1993 | Robinson ....................... D15/29 |
| 5,649,601 | A | * | 7/1997 | Nash ..................... A01B 35/26 172/194 |
| 5,711,378 | A | * | 1/1998 | Yeager ................. A01B 35/225 172/730 |
| 5,984,017 | A | * | 11/1999 | Packham ............... A01B 49/02 172/1 |
| 6,607,040 | B2 | * | 8/2003 | Skjaeveland .......... A01B 15/06 172/749 |
| 8,528,238 | B2 | * | 9/2013 | Skjæveland .......... E02F 9/2858 37/455 |
| 2003/0037936 | A1 | | 2/2003 | Skjaeveland |

FOREIGN PATENT DOCUMENTS

| | | |
|---|---|---|
| GB | 191016915 A | 1/1911 |
| GB | 114156 A | 10/1918 |
| GB | 678382 A | 9/1952 |
| SE | 64300 C | 9/1924 |
| WO | WO 2011/074983 A1 | 6/2011 |
| WO | WO 2011/144211 A1 | 11/2011 |

* cited by examiner

WEARING PART ARRANGEMENT FOR PLOUGH SHARE

A wearing-part arrangement for a leading edge of a plough body is described, in which a plough point is releasably attached to the plough body by means of a quick-release coupling device.

On a plough arranged to work cultivation soil for agricultural plants, a replaceable wearing part, often called a plough point, which is arranged to give the plough body a sufficient downward penetration, is used on each plough body, so that the plough will get down to the desired working depth. It is common to give the plough point a shape which partially follows the leading edge of the shape of the share, that is to say the lower, cutting part of the plough body, typically by the leading end face of the plough point exhibiting an oblique profile, see for example EP 1259105 and EP1900269. This entails, for a reversible plough, which is dominant in the trade today and in which there are plough bodies facing left and right, the need to provide two types of plough points, namely a left-hand plough point and a right-hand plough point.

From WO 2011/144211, a replaceable and reversible leading wearing part is known, with a transverse leading end face and oblique transition portions towards the side faces of the wearing part.

A known problem with prior-art plough points is the lack of capacity to provide sufficient soil penetration, in particular where the soil is hard and compact, whether this is due to the natural properties of the soil, for example owing to the precipitation of fines with a cementing effect, or it is due to soil packing from driving with heavy implements or soil packing due to the soil repeatedly being worked to the same depth, so that a so-called plough sole is formed. The soil-penetration capacity turns out to decrease as the plough points become worn, whether this is owing to the leading portion of the plough point, where the thickness is gradually decreasing towards a leading cutting edge, little by little exhibiting larger thickness at the leading edge portion, or a leading portion tapering in width becoming worn down to a constantly increasing width at the leading edge portion. In any case, the wear will be affected by the orientation of the plough point in the horizontal and vertical planes relative to the working direction of the plough.

The invention has for its object to remedy or reduce at least one of the drawbacks of the prior art or at least provide a useful alternative to the prior art.

The object is achieved through features which are specified in the description below in the claims that follow.

Within the trade, the term "plough point" is used about a replaceable wearing part arranged at the front of a ploughshare independently of the shape of such a wearing part. "Plough point" does not give any hint to the geometric shape of the wearing part.

It has surprisingly turned out that the application of a plough point which, at least in a front portion, is substantially mirror-symmetrical around the longitudinal axis of the plough point, typically symmetrical around a vertical plane coinciding with the longitudinal axis and standing perpendicularly to a sliding surface of the plough point, the plough point being provided with a pointed front portion, gives a beneficial effect on the soil-penetration properties of the plough. The plough reaches a desired working depth more quickly and the set working depth is maintained to a greater degree than when a plough point with an ordinary, transverse or slanted front portion is used. A further positive effect is that the same plough point can be used for both left- and right-facing plough bodies, like the plough bodies appearing in a reversible plough.

The plough point is typically attached to a ploughshare which forms the cutting, leading edge of a plough body, the leading edge of the ploughshare lying, in a working position, substantially parallel to the soil surface of the area being ploughed, and extending rearwards at an angle in a direction away from the unworked soil. The plough point is further arranged with its longitudinal axis in a vertical plane that lies substantially in the working direction of the plough and in the immediate vicinity of a share side edge facing the unworked soil. The plough point is further arranged with a side edge projecting beyond said share side edge. The following is thereby achieved:

- A first side portion of the pointed front portion of the plough point exhibits a direction fairly coinciding with the cutting, leading edge of the ploughshare and cooperates with this.
- A second side portion of the pointed front portion of the plough point cuts into the soil further out than the working width of the ploughshare, thereby providing for the share side edge lying behind to be subjected to less strain as the share side edge works at least partially in loose soil.
- The symmetrical shape of the plough point eliminates the need for different plough points for left- and right-facing plough bodies. This gives great cost reductions for the distributive trade and end user of such parts, as plough points are sold in large volumes.
- The pointed front portion of the plough point provides for quicker penetration into unworked soil when the plough is lowered, so that the plough reaches its full working depth more quickly.
- The pointed front portion of the plough point provides for better penetration into the plough sole, which forms, as experience has shown, from repeated ploughings to the same depth, and the plough thereby achieves a working depth which is more in agreement with the settings of the depth-regulating means of the plough and an associated tractor.

The invention relates more specifically to wearing-part arrangement for a leading edge of a plough body, the leading edge being provided on a ploughshare, in which a plough point is releasably attached to the plough body, and wherein the plough point is provided with a pointed front portion, at least the front portion is moirror-symmetrical around the longitudinal axis of the plough point and is provided with first and second oblique faces diverging in the direction of a socket and merging with first and second side edge surfaces, characterized in that at least a rear portion of the second oblique face and the adjacent second side edge surface project beyond a share side edge.

The longitudinal axis of a first oblique face may be approximately parallel to the leading edge or a front portion of the leading edge of the ploughshare.

The plough point may be releasably attached to the plough body by means of a quick-release coupling device.

A wearing-part holder which is arranged to receive the plough point may be releasably attached to a sliding surface of a ploughshare, an abutment surface resting against a portion of the sliding surface.

The abutment surface may be curved. In one embodiment, the abutment surface may be single-curved around an axis, which is parallel to the longitudinal axis of the plough point. In a further embodiment, the abutment surface may be single-curved around an axis, which is parallel to the longitudinal axis of the plough point with a radius that is smaller than a corresponding radius of curvature of said portion of the sliding surface of the ploughshare.

The invention also relates to a plough including left- and right-facing plough bodies, in which the ploughshares of the plough bodies are provided with a wearing-part arrangement including any one of the preceding features.

Finally, the invention includes the use of identical plough points including any one of the preceding features as replaceable wearing parts for the leading edges of the left- and right-facing plough bodies.

In what follows, an example of a preferred embodiment is described, which is visualized in the accompanying drawings, in which.

Figure 1:
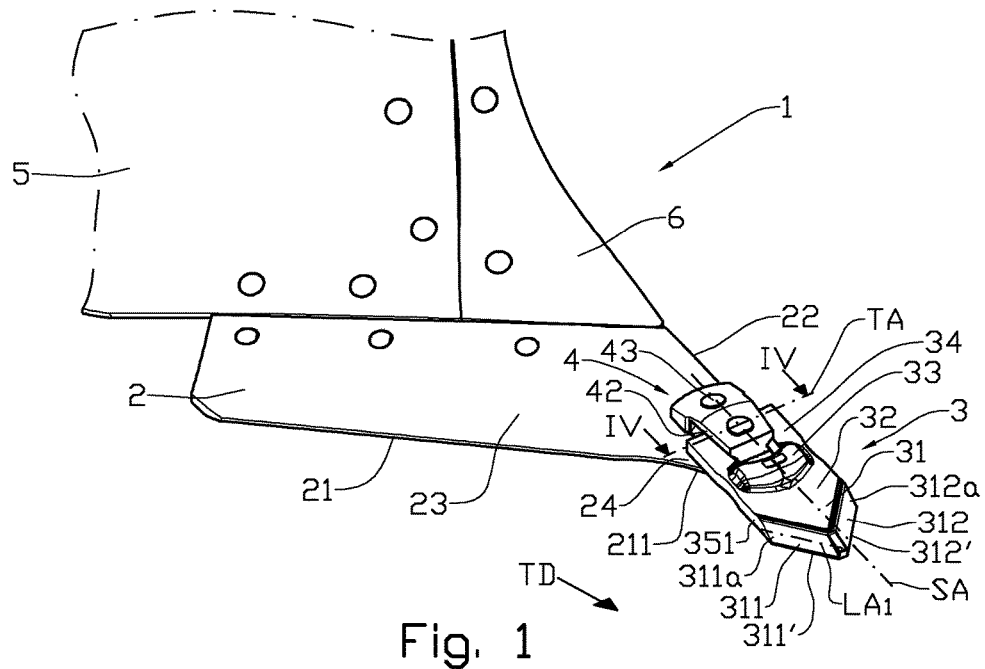
FIG. 1 shows, in perspective, a leading portion of a right-facing plough body provided with a wearing-part arrangement according to the invention.

In the figures, the reference numeral 1 indicates a plough body, shown here as a right-facing plough body. In what follows, the description of the invention is related to a right-facing plough body 1. A left-facing plough body 1a is inverted relative to what is shown in the FIGS. 1-3. For technical elements that are identical in right- and left-facing plough bodies, the relations to surrounding elements will thereby have to be perceived as the reverse of what has been described.

Reference is now made to FIG. 1 in particular. The plough body 1 includes a mouldboard 5 with a shin piece 6 and a share 2. The share 2, which forms a leading plough-body portion, is provided with a leading edge 21 lying substantially parallel to the surface of the soil in a manner known per se, when the plough body 1 is in an operative position in a soil (not shown) to be worked, and being directed rearwards at an angle relative to the working direction of the plough, which is indicated by the arrow TD.

A leading portion 24 of the ploughshare 2 forms a front portion 211 of the leading edge 21 with a somewhat more slanted and thereby partially downward direction in order thereby to improve the soil-penetration properties of the plough. To prevent the leading portion 24 of the ploughshare 2 from wearing down fast because of the abrasive effect of the soil, the ploughshare 2 is here provided with a replaceable plough point 3 which is attached by means of a wearing-part holder 4 to an upward-facing sliding surface 23 of the ploughshare 2. A socket 34 on the plough point 3 and a complementary attachment pin 41 on the wearing-part holder 4 forms a quick-release coupling device QC arranged for quick replacement of a worn plough point 3.

The plough point 3 is mirror-symmetrical around the longitudinal axis SA of the plough point 3 and is provided with a pointed front portion 31 formed by first and second oblique faces 311, 312 diverging in the direction of the socket 34 and merging with mutually parallel first and second side edge surfaces 351, 352, respectively. In the embodiment shown, according to FIG. 1, the oblique faces 311, 312 are bounded by a cutting edge 311', 312', the material thickness of the plough point 3 decreasing gradually towards said cutting edge 311', 312'.

Figure 2:
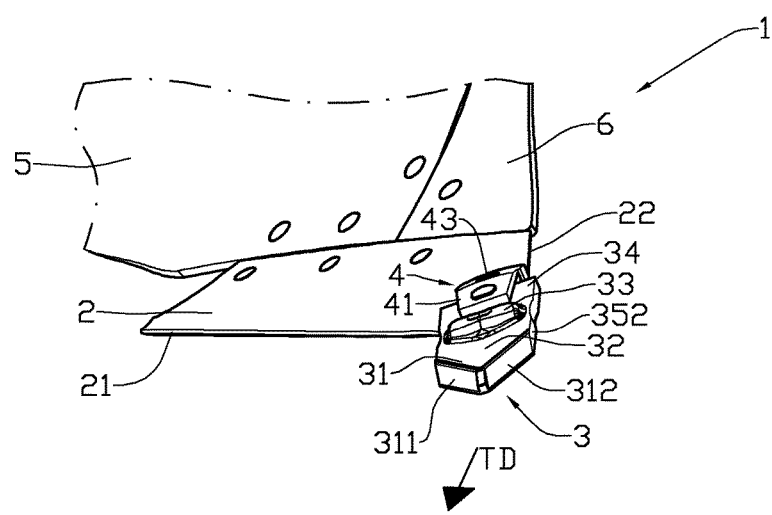
FIG. 2 shows a front view of the wearing-part arrangement according to the invention.
Figure 3:
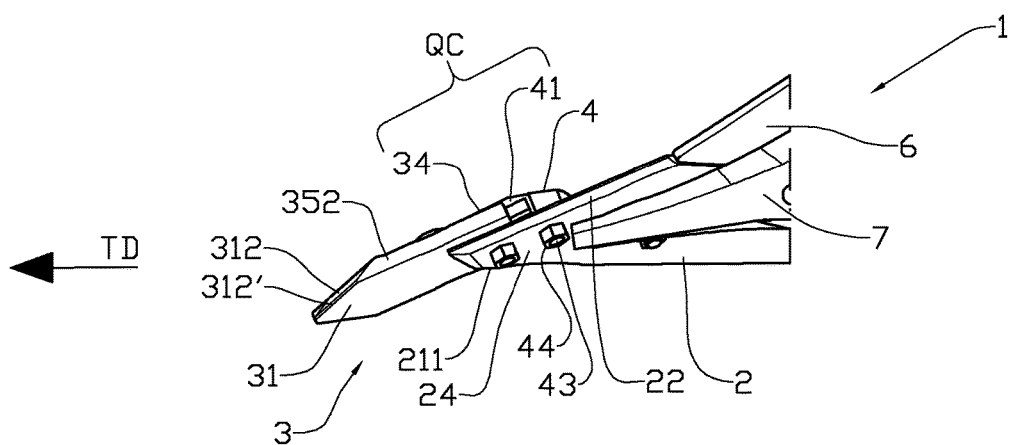
FIG. 3 shows a side view of the wearing-part arrangement according to the invention.

The upper face of the plough point 3 forms a sliding surface 32 which, in the example shown in FIGS. 1, 2 and 3, is provided with a transverse elevation 33 arranged to shield the wearing-part holder 4 from wear.

Figure 4:
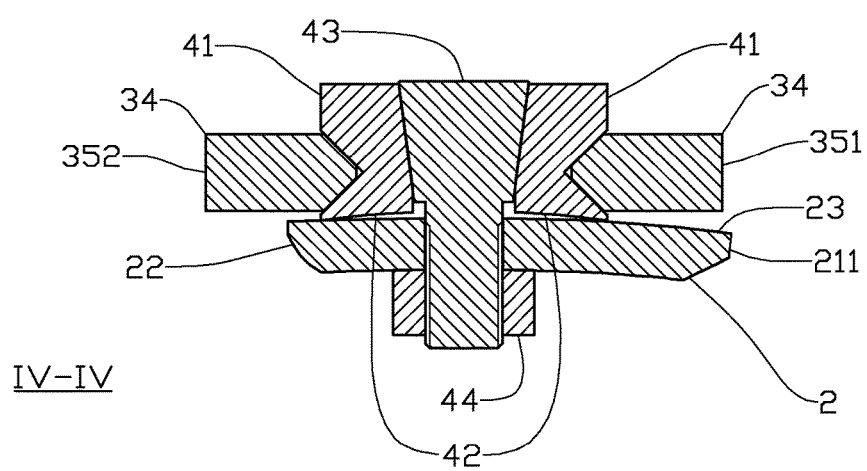
FIG. 4 shows, on a larger scale, a cross section IV-IV according to FIG. 1 of an embodiment of the wearing-part arrangement according to the invention.
Figure 5:
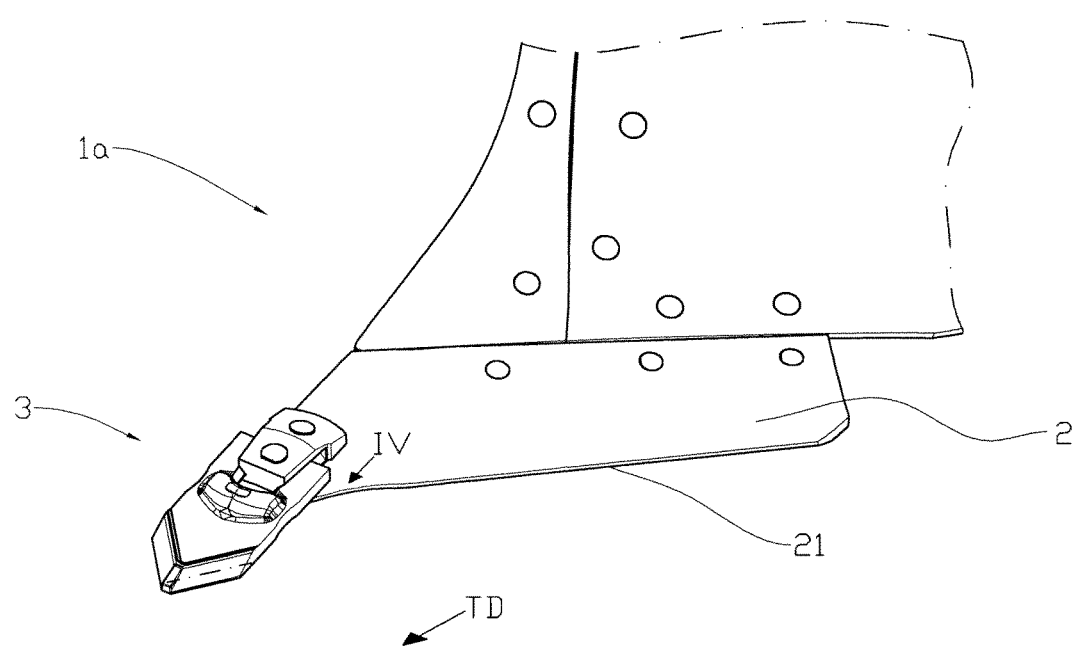
FIG. 5 shows, in perspective, a leading portion of a left-facing plough body provided with a wearing-part arrangement according to the invention.

The wearing-part holder 4 is provided with an abutment surface 42 (see FIG. 4) facing the sliding surface 23 of the ploughshare 2 in the operative position of the wearing-part holder 4. The wearing-part holder 4 is releasably attached to the ploughshare by means of attachment bolts 43 with associated nuts 44.

In one embodiment (see FIG. 4), the abutment surface 42 is curved around an axis which is parallel to the longitudinal axis SA of the plough point 3. The radius of curvature is smaller than the corresponding radius of curvature of the leading share portion 24. Thereby the wearing-part holder 4 will initially rest against the sliding surface 23 by its outer edges only and may achieve abutment by its entire abutment surface 42 only through the tightening of the attachment bolts 43 and the elastic deformation of the ploughshare 2 and/or the wearing-part holder 4 generated therefrom. In this way, a stable connection of the wearing-part holder 4 and the ploughshare 2 is ensured without the risk of the contact between the wearing-part holder 4 and the ploughshare 2 being localized via random production-generated elevations in the sliding surface 23 and the abutment surface 42, possibly foreign particles (grains of sand and so on from the soil). In one embodiment, the radius of curvature is 170 mm.

A wearing-part arrangement which is composed of the plough point 3 and the wearing-part holder 4 is arranged on the ploughshare 2 so that a horizontal projection of the longitudinal axis SA of the plough point 3 substantially coincides with the working direction TD of the plough body 1. In the embodiment shown, according to FIGS. 1, 2 and 3, a transverse axis TA is falling away from the second side edge surface 352. A rear portion 312a of the second oblique face 312 and the adjacent second side edge surface 352 project beyond a side edge 22 of the ploughshare 2 which, in an operative position of the right-facing plough body 1, faces unworked soil. Correspondingly, a rear portion 311a of the first oblique face 311 and the adjacent side edge surface 351 will project beyond the side edge 22 of the ploughshare 2 of a left-facing plough body 1a.

The horizontal projection of the first oblique face 311 of the plough point 3 exhibits a direction which is substantially parallel to the direction of the leading edge 21, possibly the front portion 211 of the leading edge 21 of a right-facing plough body 1. Correspondingly, the horizontal projection of the second oblique face 312 of the plough point 3 will exhibit a direction which is substantially parallel to the direction of the leading edge 21, possibly the front portion 211 of the leading edge 21 of a left-facing plough body 1a.

By the very fact of the plough point 3 partially projecting beyond the side edge 22 of the ploughshare 2, it will penetrate somewhat into the soil located outside the working width of the plough body 1, that is to say to the left of the right-facing plough body 1, and partly break up the soil before this meets the following side edge 22 of the ploughshare 2. The side edge 22 of the ploughshare 2 will thereby be subjected to less wear and have a longer life. Other parts, too, of the plough body 1, especially a so-called landside 7 (see FIG. 4) which gives support to the plough body 1 against the unworked earth, will have reduced wear.

The pointed front portion 31 and cutting edges 311', 312' of the plough point 3 give the plough body 1 improved soil penetration, that is to say, the plough body 1 reaches more quickly the working depth that has been set by means of means suitable therefor (not shown), typically in the form of a depth wheel and the hydraulic system of a connected tractor. This is of great importance to the quality of the work to be carried out by means of the plough, as an even ploughing depth is an important quality criterion for this type of cultivation.

The invention claimed is:

1. A plough comprising left- and right-facing plough bodies, each of the left- and right-facing plough bodies comprising:
   a mould board;
   a ploughshare that forms a leading edge of a respective one of the left- and right-facing plough bodies, the leading edge configured to lie in a working position substantially parallel to a soil surface of an area being ploughed; and
   a wearing-part arrangement for the leading edge provided on the ploughshare, the wearing-part arrangement comprising a plough point configured to be releasably attached to the ploughshare, the plough point having a pointed front portion,
   wherein at least the front portion is mirror-symmetrical around a longitudinal axis of the plough point and has a first oblique face and a second oblique face diverging in a direction of a socket on the plough point and merging with a first side edge surface and a second side edge surface,
   wherein the first oblique face is bounded by a first cutting edge, and the second oblique face is bounded by a second cutting edge,
   wherein when the plough point is attached to the ploughshare, at least a rear portion of the second oblique face and the second side edge surface adjacent to the second oblique face project beyond a ploughshare side edge, and
   wherein the plough point includes a transverse elevation projecting from an upper face thereof.

2. The plough in accordance with claim 1, wherein a longitudinal axis of the first oblique face is parallel to the leading edge or a front portion of the leading edge.

3. The plough in accordance with claim 1, wherein the plough point is releasably attached to the ploughshare by a quick-release coupling device.

4. The plough in accordance with claim 1, wherein the wearing-part arrangement is replaceable.

5. The plough according to claim 1, wherein each of the left- and right-facing plough bodies further comprises a shin piece.

6. The plough in accordance with claim 1, wherein a thickness of the plough point gradually decreases towards the first cutting edge and the second cutting edge.

7. A plough comprising left- and right-facing plough bodies, each of the left- and right-facing plough bodies comprising:
   a mould board;
   a ploughshare that forms a leading edge of a respective one of the left- and right-facing plough bodies, the leading edge configured to lie in a working position substantially parallel to a soil surface of an area being ploughed; and
   a wearing-part arrangement for the leading edge provided on the ploughshare, the wearing-part arrangement comprising
      a plough point configured to be releasably attached to the ploughshare, the plough point having a pointed front portion; and
      a wearing-part holder configured to be releasably attached to a sliding surface of the ploughshare, the wearing-part holder being configured to receive the plough point,
   wherein at least the front portion is mirror-symmetrical around a longitudinal axis of the plough point and has a first oblique face and a second oblique face diverging in a direction of a socket on the plough point and merging with a first side edge surface and a second side edge surface,
   wherein the first oblique face is bounded by a first cutting edge, and the second oblique face is bounded by a second cutting edge,
   wherein when the plough point is attached to the ploughshare, at least a rear portion of the second oblique face and the second side edge surface adjacent to the second oblique face project beyond a ploughshare side edge, and
   wherein the plough point includes a transverse elevation configured to shield the wearing-part holder from wear, the transverse elevation projecting from an upper face of the plough point.

8. The plough in accordance with claim 7, wherein the wearing-part holder has a curved abutment surface configured to rest against a portion of the sliding surface of the ploughshare.

9. The plough in accordance with claim 8, wherein the abutment surface is single-curved around an axis which is parallel to the longitudinal axis of the plough point.

10. The plough in accordance with claim 8, wherein the abutment surface is single-curved around an axis which is parallel to the longitudinal axis of the plough point, and has a radius that is smaller than a corresponding radius of curvature of the sliding surface of the ploughshare.

11. The plough in accordance with claim 7, wherein the wearing-part arrangement is replaceable.

12. The plough in accordance with claim 7, wherein the wearing-part holder includes an attachment pin that complements and mates with the socket of the plough point.

13. The plough in accordance with claim 12, wherein the plough point is releasably attached to the ploughshare by a quick-release coupling device comprised of the attachment pin and the socket.

14. The plough according to claim 7, wherein each of the left- and right-facing plough bodies further comprises a shin piece.

15. The plough in accordance with claim 7, wherein a thickness of the plough point gradually decreases towards the first cutting edge and the second cutting edge.

* * * * *